United States Patent
Archer et al.

(10) Patent No.: US 8,656,448 B2
(45) Date of Patent: *Feb. 18, 2014

(54) PROVIDING POLICY-BASED APPLICATION SERVICES TO AN APPLICATION RUNNING ON A COMPUTING SYSTEM

(75) Inventors: Charles J. Archer, Rochester, MN (US); Michael A. Blocksome, Rochester, MN (US); Joseph D. Ratterman, Rochester, MN (US); Albert Sidelnik, Saint Paul, MN (US); Brian E. Smith, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 2158 days.

This patent is subject to a terminal disclaimer.

(21) Appl. No.: 11/553,101

(22) Filed: Oct. 26, 2006

(65) Prior Publication Data

US 2008/0104452 A1 May 1, 2008

(51) Int. Cl.
*H04L 29/06* (2006.01)
(52) U.S. Cl.
USPC .................. 726/1; 707/694; 702/81; 702/84; 702/182; 705/7.36
(58) Field of Classification Search
USPC .................................................. 714/47; 726/1
See application file for complete search history.

(56) References Cited

U.S. PATENT DOCUMENTS

| | | | |
|---|---|---|---|
| 4,860,201 A | 8/1989 | Stolfo et al. | |
| 4,910,669 A | 3/1990 | Gorin et al. | |
| 5,063,562 A | 11/1991 | Barzilai et al. | |
| 5,095,444 A | 3/1992 | Motles | |
| 5,491,691 A | 2/1996 | Shtayer et al. | |
| 5,651,099 A | 7/1997 | Konsella | |
| 5,815,793 A | 9/1998 | Ferguson | |
| 5,826,262 A | 10/1998 | Bui et al. | |
| 5,826,265 A | 10/1998 | Van Huben et al. | |
| 5,859,981 A | 1/1999 | Levin et al. | |
| 5,862,381 A | 1/1999 | Advani et al. | |
| 5,875,190 A | 2/1999 | Law | |
| 5,912,893 A | 6/1999 | Rolfe et al. | |
| 5,918,020 A | 6/1999 | Blackard et al. | |

(Continued)

OTHER PUBLICATIONS

Campbell et al., "A Quality of Service Architecture", 1994, pp. 6-27.*

(Continued)

*Primary Examiner* — Taghi Arani
*Assistant Examiner* — Thaddeus Plecha
(74) *Attorney, Agent, or Firm* — Biggers Kennedy Lenart Spraggins, LLP

(57) ABSTRACT

Methods, apparatus, products are disclosed for providing policy-based application services to an application running on a computing system. The computing system includes at least one compute node. The compute node includes an application and a plurality of application services of a service type. Providing policy-based application services to an application running on a computing system includes establishing, on the compute node, a service policy specifying one of the application services of the service type for use by the application, establishing a performance ruleset, the performance ruleset specifying rules for analyzing the performance of the computing system, measuring performance of the computing system, and adjusting the service policy in dependence upon the performance ruleset and the measured performance. Providing policy-based application services to an application running on a computing system may also include accessing, by the application, the specified application service.

18 Claims, 6 Drawing Sheets

(56) References Cited

U.S. PATENT DOCUMENTS

| | | | |
|---|---|---|---|
| 5,937,201 A | 8/1999 | Matsushita et al. | |
| 5,953,336 A | 9/1999 | Moore et al. | |
| 5,982,771 A | 11/1999 | Caldara et al. | |
| 6,006,032 A | 12/1999 | Blandy et al. | |
| 6,047,122 A | 4/2000 | Spiller | |
| 6,057,839 A | 5/2000 | Advani et al. | |
| 6,101,495 A | 8/2000 | Tsuchida et al. | |
| 6,115,357 A | 9/2000 | Packer et al. | |
| 6,118,777 A | 9/2000 | Sylvain | |
| 6,126,331 A | 10/2000 | Komatsu et al. | |
| 6,253,372 B1 | 6/2001 | Komatsu et al. | |
| 6,336,143 B1 | 1/2002 | Diedrich et al. | |
| 6,438,702 B1 | 8/2002 | Hodge | |
| 6,490,566 B1 | 12/2002 | Schmidt | |
| 6,493,637 B1 | 12/2002 | Steeg | |
| 6,563,823 B1 | 5/2003 | Przygienda et al. | |
| 6,600,721 B2 | 7/2003 | Edholm | |
| 6,633,937 B2 | 10/2003 | Thomson | |
| 6,836,480 B2 | 12/2004 | Basso et al. | |
| 6,839,829 B1 | 1/2005 | Daruwalla et al. | |
| 6,952,692 B1 | 10/2005 | Bhattiprolu et al. | |
| 6,963,868 B2 | 11/2005 | Basso et al. | |
| 7,054,948 B2 | 5/2006 | Rhodes | |
| 7,197,577 B2 | 3/2007 | Nellitheertha | |
| 7,216,217 B2 | 5/2007 | Hansen et al. | |
| 7,240,059 B2 | 7/2007 | Bayliss et al. | |
| 7,301,541 B2 | 11/2007 | Hansen et al. | |
| 7,509,244 B1 | 3/2009 | Shakeri et al. | |
| 7,527,558 B2 | 5/2009 | Lavoie et al. | |
| 7,634,388 B2 | 12/2009 | Archer et al. | |
| 7,647,472 B2 | 1/2010 | Brightman et al. | |
| 7,673,011 B2 | 3/2010 | Archer et al. | |
| 7,738,443 B2 | 6/2010 | Kumar | |
| 7,779,016 B2 | 8/2010 | Archer et al. | |
| 7,853,570 B2 | 12/2010 | Hara et al. | |
| 2002/0143911 A1* | 10/2002 | Vicente et al. | 709/223 |
| 2003/0021287 A1 | 1/2003 | Lee et al. | |
| 2003/0074142 A1 | 4/2003 | Steeg | |
| 2004/0111398 A1 | 6/2004 | England et al. | |
| 2005/0060462 A1 | 3/2005 | Ota | |
| 2005/0182834 A1 | 8/2005 | Black | |
| 2006/0059196 A1 | 3/2006 | Sato et al. | |
| 2006/0203739 A1 | 9/2006 | Padmanabhan et al. | |
| 2007/0070897 A1* | 3/2007 | Doyle et al. | 370/230 |
| 2007/0179760 A1 | 8/2007 | Smith | |
| 2008/0109569 A1 | 5/2008 | Leonard et al. | |
| 2008/0148355 A1 | 6/2008 | Archer et al. | |
| 2008/0240115 A1 | 10/2008 | Briscoe et al. | |
| 2008/0313376 A1 | 12/2008 | Archer et al. | |
| 2008/0313661 A1 | 12/2008 | Blocksome et al. | |
| 2009/0089328 A1 | 4/2009 | Miller et al. | |
| 2009/0113308 A1 | 4/2009 | Almasi et al. | |
| 2009/0138892 A1 | 5/2009 | Almasi et al. | |

OTHER PUBLICATIONS

"Windows Native Processor Performance Control", Windows Platform Design Notes—Designing Hardware for the Microsoft Windows Family of Operating Systems, Nov. 12, 2002.

Bershad, Brian N et al, "SPIN—An Extensible Microkernel for Application-specific Operating System Services", ACM SIGOPS Operating System Review, vol. 29, Issue 1, Jan. 1995, pp. 74-77.

Bershad, Brian N et al, "SPIN—An Extensible Microkernel for Application-specific Operating System Services", Technical Report 94-03-03, Feb. 28, 1994, pp. 1-16 (http:/www-spin.cs.washington.edu/papers/index.html).

Hollingworth, Dennis et al, "Security Policy Realization in an Extensible Operating System", Proceedings of DARPA Information Survivability Conference and Exposition, DISCEX '00, Jan. 25-27, 2000, vol. 1, pp. 320-334.

Hollingworth et al., "Security Policy Realization in an Extensible Operating System", Proceedings of DARPA Information Survivability Conference and Exposition. DISCEX '00 (Jan. 25-27, 2000), vol. 1, pp. 320-334.

Smith et al., "Virtual Machines: Versatile Platforms for Systems and Processes", (Jun. 3, 2005), Morgan Kaufmann Publishing, pp. 458-470, 474-475, 554, 580-585.

Chan et al. "Collective Communication on Architectures that Support Simultaneous Communication over Multiple Links", PPoPP'06, Mar. 29-31, 2006, New York, New York, USA, pp. 2-11.

Mao et al. "One-To-All Personalized Communication in Torus Networks", Proceedings of the $25^{th}$ IASTED International Multi-Conference: parallel and distributed computing networks, Innsbruck, Austria, 2007, pp. 291-296.

Almasi et al. "Optimization of MPI Collective Communication on BlueGene/L Systems", ICS'05, Jun. 20-22, 2005, Boston, MA, USA, 2005, pp. 253-262.

Moreira, et al.; The Blue Gene/L Supercomputer: A Hardware and Software Story; International Journal of Parallel Programming; Jun. 2007; pp. 181-206; vol. 35, No. 3, Springer Science+Business Media LLC.; USA.

Stankovic et al.; "Visual Programming for Message-Passing Systems", (1999), International Journal of Software Engineering and Knowledge Engineering, Sydney, Australia.

Sottile et al.; "Performance Analysis of Parallel Programs Via Message-Passing Graph Traversal", College of Computing, Georgia Institute of Technology, Feb. 25, 2006.

Office Action1, U.S. Appl. No. 11/553,095, Jun. 13, 2008.
FinalOfficeAction1, U.S. Appl. No. 11/553,095, Oct. 17, 2008.
Notice of Allowance, U.S. Appl. No. 11/553,095, Apr. 8, 2009.
OfficeAction1, U.S. Appl. No. 11/553,040, Dec. 10, 2009.
OfficeAction1, U.S. Appl. No. 11/553,077, Oct. 28, 2010.
NoticeofAllowance, U.S. Appl. No. 11/553,077, Apr. 4, 2011.
Office Action1, U.S. Appl. No. 11/531,846, Oct. 3, 2008.
Final Office Action1, U.S. Appl. No. 11/531,846, Mar. 2, 2009.
Office Action2, U.S. Appl. No. 11/531,846, Jul. 31, 2009.
NoticeofAllowance, U.S. Appl. No. 11/531,846, Apr. 6, 2010.
Office Actionl, U.S. Appl. No. 11/764,282, Apr. 29, 2009.
Final Office Action1, U.S. Appl. No. 11/764,282, Dec. 8, 2009.
Office Action3, U.S. Appl. No. 11/764,282, Jul. 12, 2010.
Notice of Allowance, U.S. Appl. No. 11/764,282, Dec. 10, 2010.
Notice of Allowance, U.S. Appl. No. 11/837,015, Oct. 13, 2009.
Final Office Action1, U.S. Appl. No. 11/553,040, Apr. 29, 2010.
Office Action, U.S. Appl. No. 12/180,963, May 3, 2010.
Office Action, U.S. Appl. No. 11/946,136, Nov. 24, 2010.
Office Action, U.S. Appl. No. 11/924,934, Aug. 19, 2010.
Office Action, U.S. Appl. No. 11/832,192, Oct. 29, 2010.
Office Action, U.S. Appl. No. 12/166,748, May 27, 2010.
Office Action, U.S. Appl. No. 12/166,748, Aug. 25, 2010.
Notice of Allowance, U.S. Appl. No. 12/180,963, Oct. 20, 2010.
Final Office Action, U.S. Appl. No. 11/553,101, Mar. 31, 2010.

* cited by examiner

PROVIDING POLICY-BASED APPLICATION SERVICES TO AN APPLICATION RUNNING ON A COMPUTING SYSTEM

CROSS-REFERENCE TO RELATED APPLICATIONS

This application is related to U.S. patent application Ser. No. 11/553,040 entitled "PROVIDING POLICY-BASED OPERATING SYSTEM SERVICES IN AN OPERATING SYSTEM ON A COMPUTING SYSTEM", filed on Oct. 26, 2006; U.S. patent application Ser. No. 11/553,077 entitled "PROVIDING POLICY-BASED OPERATING SYSTEM SERVICES IN A HYPERVISOR ON A COMPUTING SYSTEM", filed on Oct. 26, 2006; and U.S. patent application Ser. No. 11/553,095 entitled "PROVIDING POLICY-BASED OPERATING SYSTEM SERVICES IN AN OPERATING SYSTEM ON A COMPUTING SYSTEM", filed on Oct. 26, 2006; all of which are incorporated by reference herein.

BACKGROUND OF THE INVENTION

1. Field of the Invention

The field of the invention is data processing, or, more specifically, methods, apparatus, and products for providing policy-based application services to an application running on a computing system.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Although software applications have evolved significantly over the last few years, some facets of application architecture have remained the same. In particular, software architects still design applications to use a fixed set of application services after the application is installed. That is, the application utilizes the same algorithm to provide each type of service used by the application. In an application that utilizes application services to perform various computational algorithms on matrices, for example, the application may utilize the same algorithm to perform single-precision matrix multiplication, the same algorithm to perform double-precision matrix multiplication, the same algorithm to perform complex single-precision matrix multiplication, the same algorithm to perform complex double-precision matrix multiplication, and so on. Often, however, one application service utilizes computer resources in one environment more efficiently than another application service of the same service type. Continuing with the example above, one application service that performs double-precision matrix multiplication may utilize computer resources more efficiently in a computing system with large amounts of free memory than another application service that performs double-precision matrix multiplication. Because current applications use the same application services without regard to computer resource utilization, overall application performance and system performance often suffer. Readers will therefore appreciate that room for improvement exists in the manner in which applications use application services.

SUMMARY OF THE INVENTION

Methods, apparatus, products are disclosed for providing policy-based application services to an application running on a computing system. The computing system includes at least one compute node. The compute node includes an application and a plurality of application services of a service type. Providing policy-based application services to an application running on a computing system includes establishing, on the compute node, a service policy specifying one of the application services of the service type for use by the application, establishing a performance ruleset, the performance ruleset specifying rules for analyzing the performance of the computing system, measuring performance of the computing system, and adjusting the service policy in dependence upon the performance ruleset and the measured performance. Providing policy-based application services to an application running on a computing system may also include accessing, by the application, the specified application service.

In addition, each application service may be characterized by operating parameters. Providing policy-based application services to an application running on a computing system may include adjusting the operating parameters of the specified application service in dependence upon the performance ruleset and the measured performance.

The computing system may also be implemented as a distributed computing system that includes one or more application service nodes. One or more of the application services may be distributed among the application service nodes. The service policy also specifies an application service node that is to provide the specified application service. Providing policy-based application services to an application running on a computing system may include administering the application service nodes in dependence upon the performance ruleset and the measured performance.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
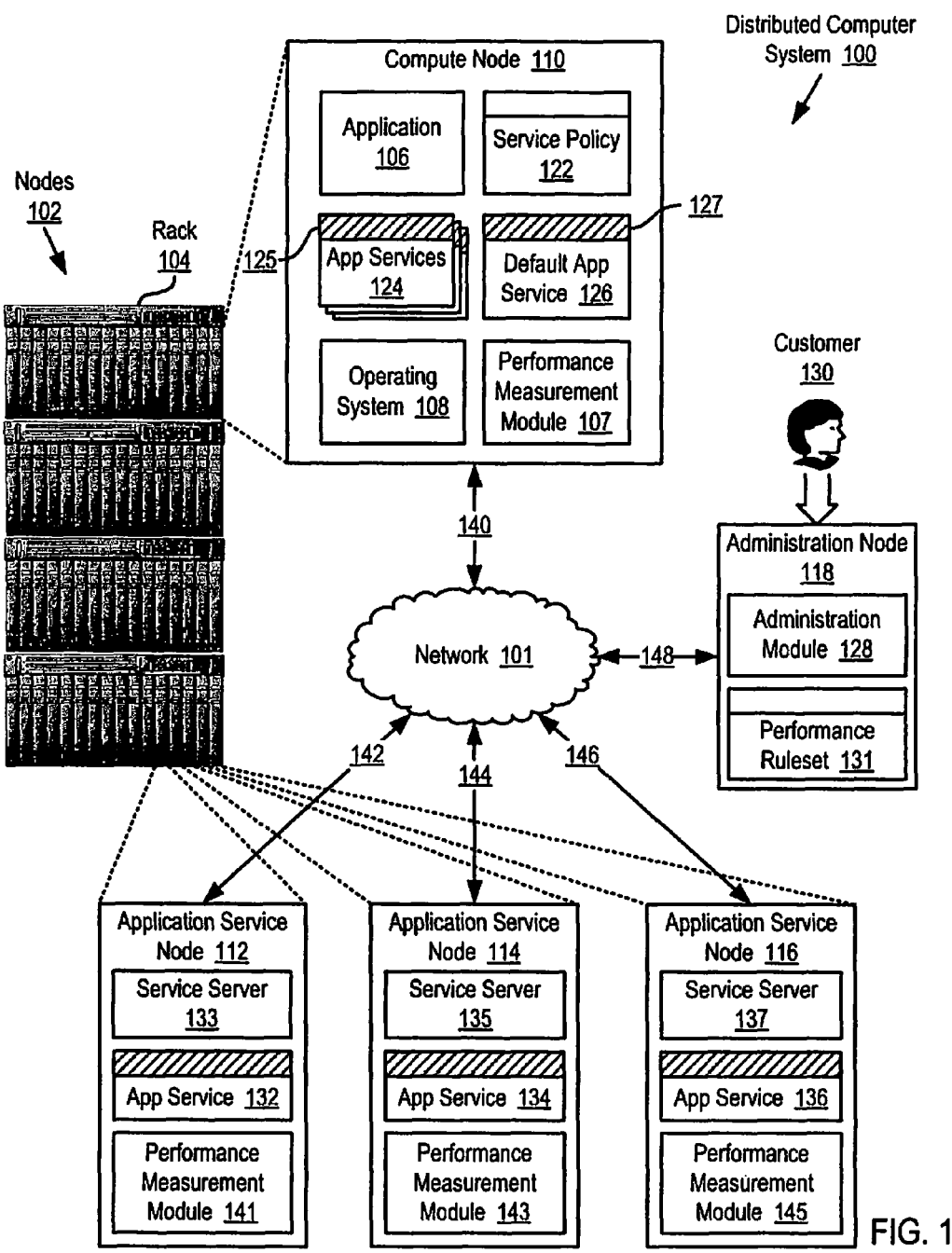
FIG. 1 sets forth a network diagram illustrating an exemplary computing system for providing policy-based application services to an application according to embodiments of the present invention.

Exemplary methods, apparatus, and products for providing policy-based application services to an application running on a computing system according to embodiments of the present invention are described with reference to the accompanying drawings, beginning with FIG. 1. FIG. 1 sets forth a network diagram illustrating an exemplary computing system (100) for providing policy-based application services to an application according to embodiments of the present invention. The exemplary computing system (100) of FIG. 1 includes a compute node (110). The compute node (110) includes an application (106) and a plurality of application services (124) of a service type. The exemplary computing system (100) of FIG. 1 operates generally to provide policy-based application services to an application (106) by establishing, on the compute node, a service policy specifying one of the application services of the service type for use by the application and accessing, by the application (106), the specified application service. The exemplary computing system (100) of FIG. 1 operates generally to provide policy-based application services to an application (106) according to embodiments of the present invention by establishing, on the compute node, a service policy (122) specifying one of the application services (124) of the service type for use by the application (106), establishing a performance ruleset (131), the performance ruleset (131) specifying rules for analyzing the performance of the computing system, measuring performance of the computing system, and adjusting the service policy in dependence upon the performance ruleset (131) and the measured performance.

In the example of FIG. 1, the exemplary computing system (100) is implemented as a distributed computing system. A distributed computing system is a computing system that uses two or more network connected computing devices to accomplish a common task. The distributed computer system (100) of FIG. 1 includes the compute node (110), application service nodes (112, 114, 116), and an administration node (118) connected together for data communications through network (101). The compute node (110) connects to network (101) through wireline connection (140). The application service node (112) connects to network (101) through wireline connection (142). The application service node (114) connects to network (101) through wireline connection (144). The application service node (116) connects to network (101) through wireline connection (146). The administration node (118) connects to network (101) through wireline connection (148). The common task in the distributed computing system (100) of FIG. 1 includes providing a policy-based application services to an application according to embodiments of the present invention.

In the example of FIG. 1, the compute node (110) is implemented using one of the nodes (102) installed in a computer rack (104). Each node (102) of FIG. 1 is a processing device that executes computer program instructions. Each node (102) includes one or more computer processors and computer memory operatively coupled to the computer processors. The nodes (102) of FIG. 1 are implemented as blade servers installed in server chassis that are, in turn, mounted on the computer rack (104). Readers will note, however, that implementing the nodes as blade servers is for explanation and not for limitation. In fact, the nodes of FIG. 1 may be implemented as network connected workstations, computers connected together to form a computer cluster, computing devices in a parallel computer, or any other implementation as will occur to those of skill in the art.

In the example of FIG. 1, the compute node (110) is a node configured with the application (106), the application services (124), and the service policy (122) useful in providing policy-based application services to an application running on a computing system according to embodiments of the present invention. Typically, the service policy (122) is established on the compute node to optimize the utilization of node resources by the application (106) configured for execution on the node. The application (106) is a set of computer program instructions implementing user-level data processing using the application services specified in the service policy (122). The application may be a stand-alone application in which all the computer program instructions of the application (106) are executed on a single compute node, or the application (106) may be a distributed application in which portions of the computer program instructions are executed serially or in parallel with other portions of the computer program instructions being executed on other compute nodes.

To control the execution of the application (106) on the compute node (110), the compute node (110) of FIG. 1 is also configured with the operating system (108). The operating system (108) of FIG. 1 is system software that manages the hardware and software resources of a processing device such as the compute node (110). The operating system (108) performs basic tasks such as, for example, controlling and allocating memory, prioritizing the processing of instructions, controlling input and output devices, facilitating networking, and managing files.

In the exemplary system (100) of FIG. 1, each application service (124) is a application-level software component that either implements a type of service not implemented in the operating system, not implemented in the application (106) itself, or that is a specialized version of a type of service already provided by the application (106). For explanation, consider, for example, that the application (106) of FIG. 1 does not implement any application-level services that perform complex double-precision matrix multiplication. In such an example, if several of the application services (124) implement a complex double-precision matrix multiplication service, then the application (106) uses the complex double-precision matrix multiplication service specified in the in the service policy (122). Consider, further for example, that the application (106) of FIG. 1 implements a generic single-precision matrix multiplication service. In such an example, if one of the application services (124) also implements a specialized single-precision matrix multiplication service tailored for a particular computing environment, then the application (106) may use either the generic or the specialize single-precision matrix multiplication service depending on the configuration of the service policy (122).

Each application service (124) of FIG. 1 provides an application service of a particular service type. The types of services provided by the application services (124) may include, for example, mathematical computation services, security services, communications services, and any other types of application-level services useful to an application program as will occur to those of skill in the art.

To allow the application (106) to use application services of the same service type interchangeably, the application services for services of the same service type have the same application programming interface. That is, the service API (125) for each service (124) of a particular service type have the same set of member methods and parameters that the application (106) may use to access the application services (124). Because the services of each service type have the same service API, the application (106) may access the application service specified in the service policy (122) using the same application programming interface regardless of which application service is specified in the service policy (122) for the particular service type.

In the exemplary system (100) of FIG. 1, one or more of the application services (124) are distributed among the application service nodes (112, 114, 116). That is, the computer program instructions for implementing one or more of the application services (124) reside on the application service nodes (112, 114, 116). The corresponding application services (124) for each of the services (132, 134, 136) may be implemented as copies of the computer program instructions implementing each of the services (132, 134, 136). The corresponding application services (124) for each of the services (132, 134, 136) may also be implemented using a data communications subsystem that accesses the application services (132, 134, 136) on the application service nodes (112, 114, 116). Examples of such a data communication subsystem may include a web services engine, a CORBA object on the compute node (110) that accesses the application services (132, 134, 136) on the application service nodes (112, 114, 116) using remote procedure calls, use of an MPI library, or any other implementation as will occur to those of skill in the art.

'CORBA' refers to the Common Object Request Broker Architecture, a computer industry specifications for interoperable enterprise applications produced by the Object Management Group ('OMG'). CORBA is a standard for remote procedure invocation first published by the OMG in 1991. CORBA can be considered a kind of object-oriented way of making remote procedure calls, although CORBA supports features that do not exist in conventional remote procedure calls. CORBA uses a declarative language, the Interface Definition Language ("IDL"), to describe an object's interface. Interface descriptions in IDL are compiled to generate 'stubs' for the client side and 'skeletons' on the server side. Using this generated code, remote method invocations effected in object-oriented programming languages, such as C++ or Java, look like invocations of local member methods in local objects.

'MPI' refers to 'Message Passing Interface,' a prior art parallel communications library, a module of computer program instructions for data communications on parallel computers. Examples of prior-art parallel communications libraries that may be useful for providing policy-based application services to an application running on a computing system according to embodiments of the present invention include MPI and the 'Parallel Virtual Machine' ('PVM') library. PVM was developed by the University of Tennessee, The Oak Ridge National Laboratory and Emory University. MPI is promulgated by the MPI Forum, an open group with representatives from many organizations that define and maintain the MPI standard. MPI at the time of this writing is a de facto standard for communication among nodes running a parallel program on a distributed memory parallel computer. This specification sometimes uses MPI terminology for ease of explanation, although the use of MPI as such is not a requirement or limitation of the present invention.

In the example of FIG. 1, the application service nodes (112, 114, 116) are implemented using the nodes (102) installed in the computer rack (104). Each application service node (112, 114, 116) is a node that provides application services to an application installed on a compute node. Each application service node may provide one or more application services to one or more application running on one or more compute nodes. In distributed computing systems having many nodes, however, each application service node typically provides only one application service due to the abundance of nodes in the system. In the example of FIG. 1, the application service node (112) provides application service (132) to the application (106); the application service node (114) provides application service (134) to the application (106); and the application service node (116) provides application service (136) to the application (106).

To provide application services to the application (106), each application service node (112, 114, 116) of FIG. 1 has installed upon it an service server. The application service node (112) includes service server (133), the application service node (114) includes service server (135), and the application service node (116) includes service server (137). Each service server (133, 135, 137) is a software component that provides an application service to an application in response to a request sent by an application or in response to receiving an instruction from a system administrator. Each application service server (133, 135, 137) may provide an application service to an application by transmitting the computer program instructions implementing the requested application service to the application and allowing the compute node on which the application is installed to execute the computer program instructions. Each application service server (133, 135, 137) may also provide an application service by instructing the application service node of the server to execute the computer program instructions implementing the requested application service. The application (106) may communicate with the application service servers (133, 135, 137) using web services, calling member methods of a CORBA object, use of an MPI library, or any other data communications implementation as will occur to those of skill in the art.

As mentioned above, the compute node (110) includes two or more application services (124) for a particular service type. For example, the compute node (110) may include two different implementations of a single-precision matrix multiplication service for use by the application depending on the configuration of the exemplary system (100). In another example, the compute node (110) may include two different implementations of a security data decryption service depending on the availability of free computer memory. Having more than one application service for a particular service type advantageously provides the flexibility to optimize the application's service algorithms according to the hardware and software environment in which the application runs.

The service policy (122) of FIG. 1 is a table that maps one of the application services (124) to a type of application service used by the application (106). The application (106) uses the service policy (122) to identify which application service to use for a particular service type. Regardless of whether the application services (124) reside locally on the compute node (110) or are distributed on other nodes such as application service nodes (112, 114, 116), the service policy (122) specifies one of the application services of a particular service type for use in the application (106). When the application service specified in the service policy is distributed on one of the application service nodes (112, 114, 116), the service policy (122) also specifies an application service node that is to provide the specified application service. Using the service policy (122), the application (106) provides policy-based application services to an application running on a computing system according to embodiments of the present invention by accessing the application service specified in the policy (122).

Often the service policy (122) will not specify an application service for one of the service types used in the application (106) or the application (106) will be unable to access the application service specified in the policy (122). In the example of FIG. 1, the compute node (110) therefore includes a default application service (126). The default application service (126) is an application service of a particular service type that the application (106) may use when the service policy (122) does not specify an application service for the particular service type or the application (106) is unable to access the application service specified in the policy (122). Consider, for example, that the service policy (122) does not specify a matrix multiplication service for use by the application (106), that the application (106) does not implement a matrix multiplication service itself, and that the default application service implements a matrix multiplication service. Because the application (106) does not implement a matrix multiplication service and no matrix multiplication service is specified in the service policy (122), the application (106) in such an example will use the default application service (126) implementing the matrix multiplication service. The application (106) may access the default application service (126) using inter-process communication or the default application service API (127).

In the exemplary of FIG. 1, each node (110, 112, 114, 116) includes a performance measurement module. The compute node (110) of FIG. 1 includes a performance measurement module (107). The application service node (112) of FIG. 1 includes a performance measurement module (141). The application service node (114) of FIG. 1 includes a performance measurement module (143). The application service node (116) of FIG. 1 includes a performance measurement module (145).

In the example of FIG. 1, each performance measurement module (107, 141, 143, 145) is a software component for providing policy-based application services to an application running on a computing system according to embodiments of the present invention. Each performance measurement module (107, 141, 143, 145) includes a set of computer program instructions for measuring performance of the computing system (100). In the example of FIG. 1, more particularly, the performance measurement module (107) measures the performance of compute node (110) and the software executing on compute node (110). The performance measurement module (141) measures the performance of application service node (112) and the software executing on the node (112). The performance measurement module (143) measures the performance of application service node (114) and the software executing on the node (114). The performance measurement module (145) measures the performance of application service node (116) and the software executing on the node (116).

Examples of the performance measured may include the percentage of processor utilization used by each process being executed by the processors in the computing system (100), the percentage of available processing time for each processor in the computing system (100), the number of page faults that occur on each processor in the computing system (100), the amount of available memory accessible by each processor in the computing system (100), the amount of memory occupied by the software components executing on each processor, and so on. Such performance measurements may be used to adjust the service policy (122) to optimize the configuration of the computing system (100).

In the example of FIG. 1, the distributed computing system (100) is configured by a system administrator (130) through an administration node (118). The administration node (118) of FIG. 1 is a computing device that administers the configuration of the computing system (100) of FIG. 1. The administration node (118) may be implemented as one of the nodes (102) installed in the rack (104), a workstation network connected to the nodes (102), or any other computer as will occur to those of skill in the art.

In the exemplary system (100) of FIG. 1, the administration module (118) has installed upon it an administration module (128). The administration module (128) is a software component through which a system administrator (130) configures the exemplary computer system (100). The administration module (128) allows a system administrator (130) to configure the exemplary computer system (100) by providing a user interface for the system administrator (130) to interact with the administration module (128) and by configuring the application (106) and the application (124) provided by the system administrator (130) on one or more compute nodes such as, for example, the compute node (110). The administration module (128) includes a set of computer program instructions for providing policy-based application services to an application running on a computing system according to embodiments of the present invention by establishing, on the compute node, the service policy (122) specifying one of the application services of the service type for use by the application.

The administration module (128) of FIG. 1 also includes a set of computer program instructions for providing policy-based application services to an application running on a computing system by establishing a performance ruleset (131). In the example of FIG. 1, the performance ruleset (131) is a table that specifies rules for analyzing the performance of the computing system (100). To obtain the performance of the computing system (100), the administrative module (128) may poll each node (110, 112, 114, 116) for their measured performance, or each node (110, 112, 114, 116) may periodically transmit their measured performance to the administration mode (118).

The administration module (128) of FIG. 1 also includes a set of computer program instructions for providing policy-based application services to an application running on a computing system by adjusting the service policy (122) in dependence upon the performance ruleset (131) and the measured performance, adjusting the operating parameters of the application services (124) in dependence upon the performance ruleset (131) and the measured performance, and administering the application service nodes in dependence upon the performance ruleset (131) and the measured performance. After adjusting the operating parameters of the application services (124) distributed on the nodes (112, 114, 116), the administration node (118) may transmit a message to the application (106) indicating that the application (106) needs to obtain the latest version of the application service distributed on the nodes (112, 114, 116). The administrative module (128) may communicate with the nodes (110, 112, 114, 116) through a data communication connection implemented using shared memory space, a CORBA framework, a JTAG network, web services, a MPI library, or any other data communication implementation as will occur to those of skill in the art.

'JTAG' is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient 'back door' into the system. Using a JTAG network, the administration module may efficiently configure processor registers and memory in the nodes (110, 112, 114, 116) for use in providing policy-based application services to an application running on a computing system according to embodiments of the present invention.

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example Transmission Control Protocol ('TCP'), Internet Protocol ('IP'), HyperText Transfer Protocol ('HTTP'), Wireless Access Protocol ('WAP'), Handheld Device Transport Protocol ('HDTP'), the MPI protocol, and others as will occur to those of skill in the art. Various embodiments of the present invention may be implemented on a variety of hardware platforms in addition to those illustrated in FIG. 1. For example, the computing system useful for providing policy-based application services to an application according to embodiments of the present invention may also be implemented as a parallel computer such as, for example, IBM's BlueGene/L.

Providing policy-based application system services to an application running on a computing system in accordance with the present invention is generally implemented with computers, that is, with automated computing machinery. In the system of FIG. 1, for example, all the nodes are implemented to some extent at least as computers. For further explanation, therefore, FIG. 2 sets forth a block diagram of automated computing machinery comprising an exemplary compute node (110) useful in providing policy-based application services to an application running on a computing system according to embodiments of the present invention. The compute node (110) of FIG. 2 includes at least one computer processor (156) or 'CPU' as well as random access memory (168) ('RAM') which is connected through a high speed memory bus (166) and bus adapter (158) to processor (156) and to other components of the compute node.

Figure 2:
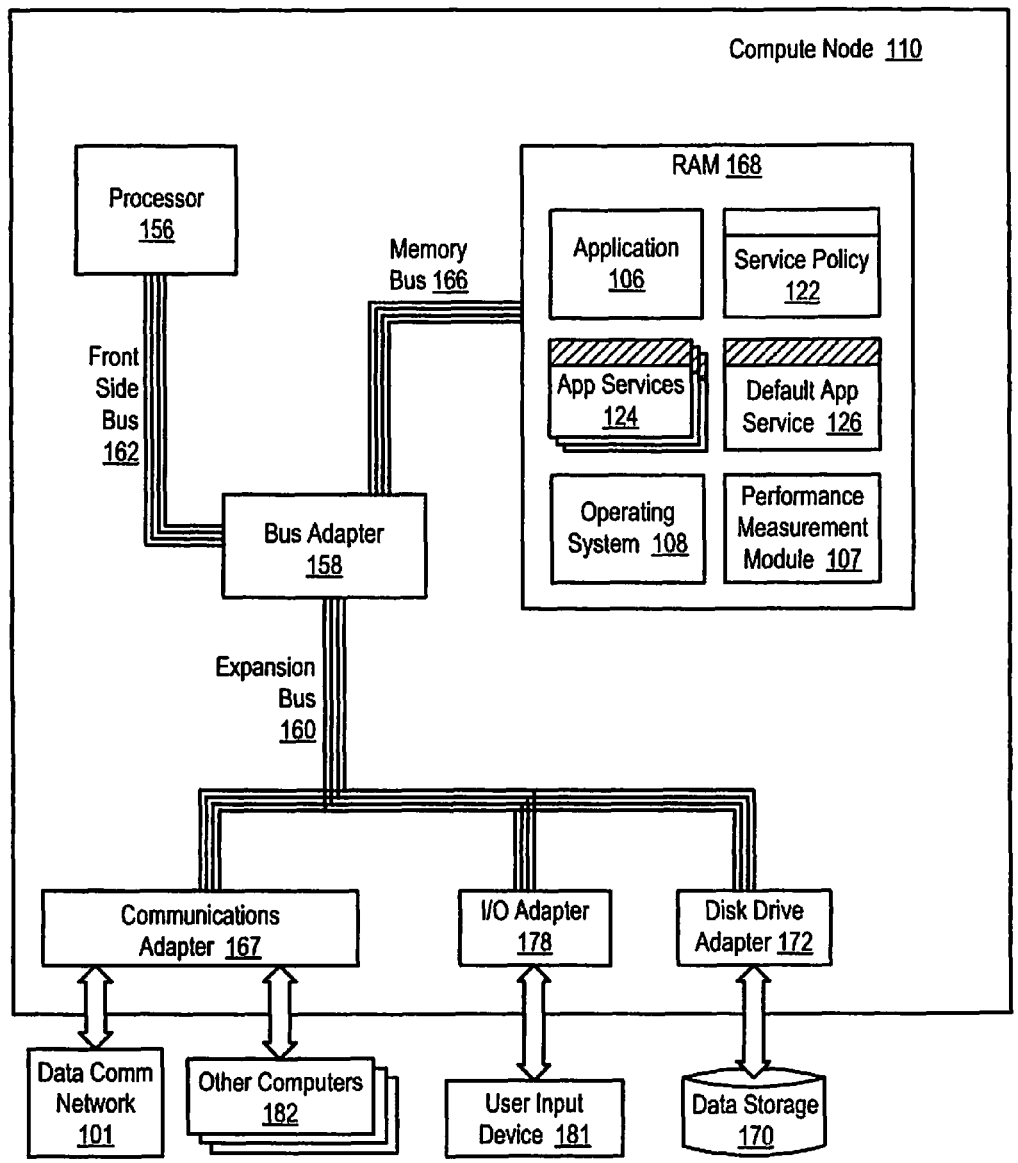
FIG. 2 sets forth a block diagram of automated computing machinery comprising an exemplary compute node useful in providing policy-based application services to an application running on a computing system according to embodiments of the present invention.

Stored in RAM (168) are an application (106), a service policy (122), application services (124), a default application service (126), a performance measurement module (107), and an operating system (108). As mentioned above, the application (106) is a set of computer program instructions implementing user-level data processing using the application services specified in the service policy (122). The service policy (122) of FIG. 1 is a table that maps one of the application services (124) to a type of application service used by the application (106). The performance measurement module (107), the application services (124), and the default application service (126) illustrated in FIG. 2 are software components, that is computer program instructions, that operate as described above with reference to FIG. 1 regarding the compute node. Operating systems that may be improved for providing policy-based application services to an application running on a computing system in accordance with the present invention may include UNIX™, Linux™, Microsoft NT™, IBM's AIX™, IBM's i5/OS™, and others as will occur to those of skill in the art. The application (106), the service policy (122), the application services (124), the default application service (126), the performance measurement module (107), and the operating system (108) in the example of FIG. 2 are shown in RAM (168), but many components of such software typically are stored in non-volatile memory also, for example, on a disk drive (170).

The exemplary compute node (110) of FIG. 2 includes bus adapter (158), a computer hardware component that contains drive electronics for high speed buses, the front side bus (162), and the memory bus (166), as well as drive electronics for the slower expansion bus (160). Examples of bus adapters useful in compute nodes useful according to embodiments of the present invention include the Intel Northbridge, the Intel Memory Controller Hub, the Intel Southbridge, and the Intel I/O Controller Hub. Examples of expansion buses useful in compute nodes useful according to embodiments of the present invention may include Peripheral Component Interconnect ('PCI') buses and PCI Express ('PCIe') buses.

Although not depicted in the exemplary compute node (110) of FIG. 2, the bus adapter (158) may also include drive electronics for a video bus that supports data communication between a video adapter and the other components of the compute node (110). FIG. 2 does not depict such video components because a compute node is typically implemented as a blade server installed in a server chassis or a node in a parallel computer with no dedicated video support. Readers will note, however, that a compute node useful in embodiments of the present invention may include such video components.

The exemplary compute node (110) of FIG. 2 also includes disk drive adapter (172) coupled through expansion bus (160) and bus adapter (158) to processor (156) and other components of the exemplary compute node (110). Disk drive adapter (172) connects non-volatile data storage to the exemplary compute node (110) in the form of disk drive (170). Disk drive adapters useful in compute nodes include Integrated Drive Electronics ('IDE') adapters, Small Computer System Interface ('SCSI') adapters, and others as will occur to those of skill in the art. In addition, non-volatile computer memory may be implemented for a compute node as an optical disk drive, electrically erasable programmable read-only memory (so-called 'EEPROM' or 'Flash' memory), RAM drives, and so on, as will occur to those of skill in the art.

The exemplary compute node (110) of FIG. 2 includes one or more input/output ('I/O') adapters (178). I/O adapters in compute node implement user-oriented input/output through, for example, software drivers and computer hardware for controlling output to display devices such as computer display screens, as well as user input from user input devices (181) such as keyboards and mice. Although not depicted in the example of FIG. 2, compute nodes in other embodiments of the present invention may include a video adapter, which is an example of an I/O adapter specially designed for graphic output to a display device such as a display screen or computer monitor. A video adapter is typically connected to processor (156) through a high speed video bus, bus adapter (158), and the front side bus (162), which is also a high speed bus.

The exemplary compute node (110) of FIG. 2 includes a communications adapter (167) for data communications with other computers (182) and for data communications with a data communications network (101). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for providing policy-based application services to an application running on a computing system according to embodiments of the present invention include modems for wired dial-up communications, IEEE 802.3 Ethernet adapters for wired data communications network communications, and IEEE 802.11b adapters for wireless data communications network communications.

Although FIG. 2 is discussed with reference to an exemplary compute node, readers will note that automated computing machinery comprising exemplary application service nodes and exemplary administration nodes useful in providing policy-based application services to an application running on a computing system according to embodiments of the present invention are similar to the exemplary compute node (110) of FIG. 2. That is, such exemplary application service nodes and exemplary administration nodes include one or more processors, bus adapters, buses, RAM, communications adapters, I/O adapters, disk drive adapters, and other components similar to the exemplary compute node (110) of FIG. 2 as will occur to those of skill in the art.

Figure 3:
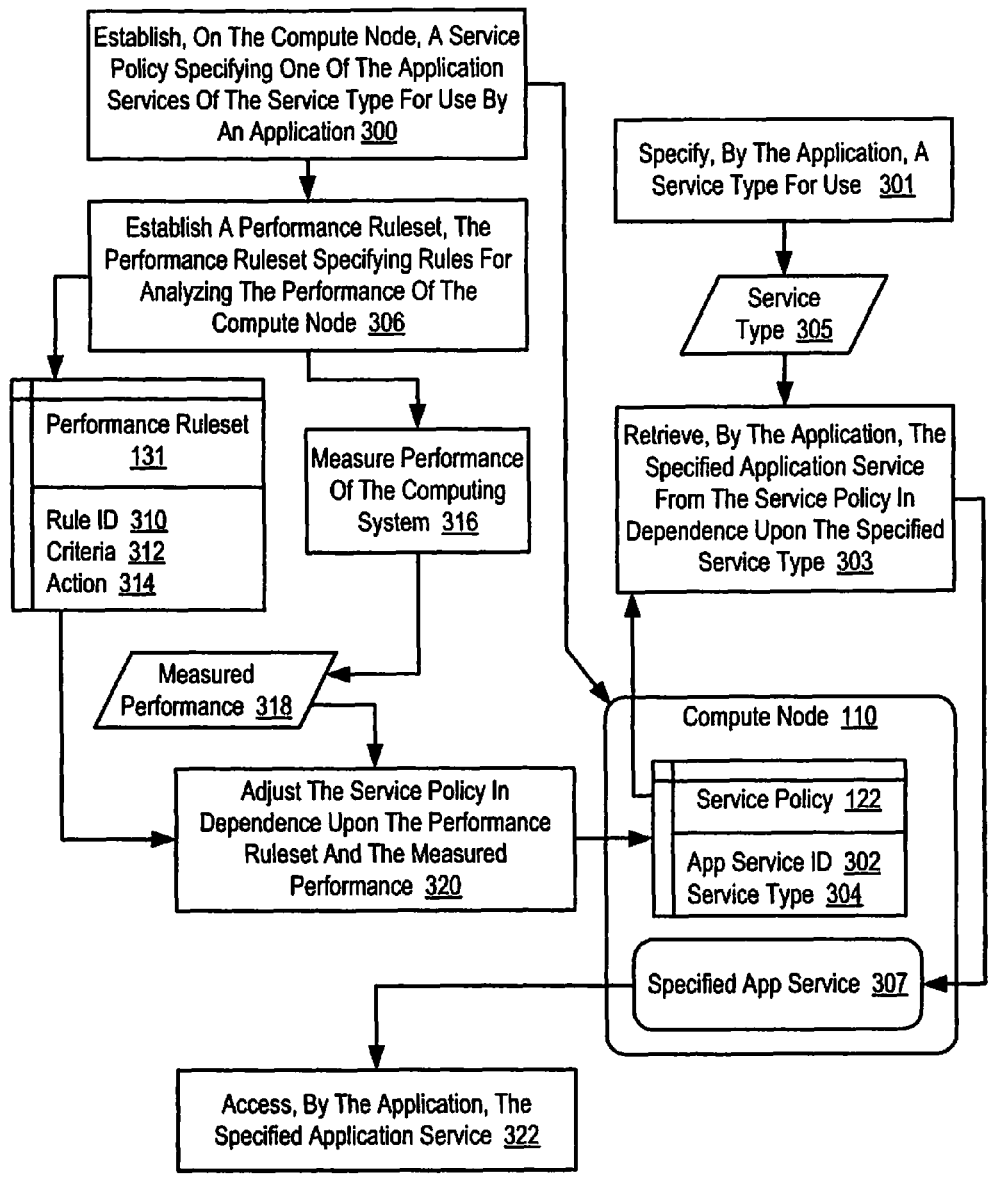
FIG. 3 sets forth a flow chart illustrating an exemplary method for providing policy-based application services to an application running on a computing system according to embodiments of the present invention.

For further explanation, FIG. 3 sets forth a flow chart illustrating an exemplary method for providing policy-based application services to an application running on a computing system according to embodiments of the present invention. The computing system includes at least one compute node (110). The compute node (110) includes an application and a plurality of application services of a service type.

The method of FIG. 3 includes establishing (300), on the compute node, a service policy (122) specifying one of the application services of the service type for use by the application. The service policy (122) of FIG. 1 is a table that maps one of the application services (124) to a type of application service used by the application (106). In the example of FIG. 3, each record of the service policy (122) identifies which application service the application uses for a particular service type. To identify which application service the application uses for a particular service type, each record of the service policy (122) includes an application service identifier (302) and a service type (304). Examples types (304) of application services that may be specified in the service policy (122) may include mathematical computation services, security services, communications services, and any other types of services useful to an application as will occur to those of skill in the art. For an example of a service policy (122) useful in providing policy-based application services to an application running on a computing system according to embodiments of the present invention, consider the following table:

TABLE 1

Example Service Policy

| Application Service ID | Service Type |
|---|---|
| SPMM2 | Single_Prec_Matrix_Mult |
| DPMM1 | Dbl_Prec_Matrix_Mult |
| CplxDPMM1 | Cplx_Dbl_Prec_Matrix_Mult |

In the exemplary service policy of Table 1, associating the value 'SPMM2' for the application service identifier (302) with the value 'Single_Prec_Matrix_Mult' for the service type (304) specifies that the application use the application service that implements the SPMM2 algorithm when the application needs to access a single precision matrix multi-plication service type. Associating the value 'DPMM1' for the application service identifier (302) with the value 'Dbl_Prec_Matrix_Mult' for the service type (304) specifies that the application use the application service that implements the DPMM1 algorithm when the application needs to access a double precision matrix multiplication service type. Associating the value 'CplxDPMM1' for the application service identifier (302) with the value 'Cplx_Dbl_Prec_Matrix_Mult' for the service type (304) specifies that the application use the application service that implements the CplxDPMM1 when the application uses a complex double precision matrix multiplication service type. Readers will note that exemplary service policy (122) above is for explanation and not for limitation. Other service policies as will occur to those of skill in the art may also be useful in providing policy-based application services to an application running on a computing system according to embodiments of the present invention.

In the method of FIG. 3, establishing (300), on the compute node, a service policy (122) specifying one of the application services of the service type for use by the application may be carried out by receiving, in an administration module from a system administrator, a mapping between the application services and the service types and creating, by the administration module, the service policy (122) on the compute node according to the mappings. The administration module is a software component that the system administration may use to configure the computing system that includes the compute node. The particular compute node on which the administration module creates the service policy (122) is typically specified by the system administrator through a user interface provided by the administration module. The administration module may be installed directly on the compute node or any other computer network connected to the compute node. The administration module may create the service policy (122) on the compute node through a data communication connection implemented using shared memory space, a CORBA framework, a JTAG network, web services, a MPI library, or any other data communication implementation as will occur to those of skill in the art.

The method of FIG. 3 also includes establishing (306) a performance ruleset (131). The performance ruleset (131) is a table that specifies rules for analyzing the performance of the computing system. In the example of FIG. 3, each record of the performance ruleset (131) identifies an action to be performed when the performance of the computing system satisfies predetermined criteria. To identify an action to be performed when the performance of the computing system satisfies predetermined criteria, each record of the performance ruleset (131) includes a rule identifier (310), criteria (312), and an action (314). For an example of a performance ruleset (131) useful in providing policy-based application services to an application running on a computing system according to embodiments of the present invention, consider the following table:

TABLE 2

Example Performance Ruleset

| Rule ID | Criteria | Action |
|---|---|---|
| 1 | CN.CPMMProcess > 70% & CN.CPMMProcess ≤ 85% | CN.Adjust_Single_Prec_Matrix_Mult |
| 2 | CN. CPMMProcess > 85% | CN.Switch_Single_Prec_Matrix_Mult |

TABLE 2-continued

Example Performance Ruleset

| Rule ID | Criteria | Action |
|---|---|---|
| 3 | ASN1.ServerProcess > 95% | ASN1.Add_Node |
| 4 | ASN1.ServerProcess < 40% | ASN1.Reconfig_Node |

In exemplary rule '1' of the performance ruleset of Table 2, associating the value 'CN.CPMMProcess>70% & CN.CPMMProcess≤85%' for the criteria (312) with the value 'CN.Adjust_Single_Prec_Matrix_Mult' for the action (413) specifies adjusting the operating parameters of the current single precision matrix multiplication service of the compute node when the process of the current single precision matrix multiplication service consumes on average more than seventy percent and less than eighty-five percent of the available memory on the compute node. In exemplary rule '2', associating the value 'CN.CPMMProcess>85%' for the criteria (312) with the value 'CN.Switch_Single_Prec_Matrix_Mult' for the action (413) specifies adjusting the service policy (122) of the compute node to switch the single precision matrix multiplication service used by the application when the process of the current single precision matrix multiplication service consumes on average more than eighty-five percent of the available memory on the compute node.

The exemplary rules '3' and '4' of the performance ruleset of Table 2 demonstrate exemplary rules that may be useful when one or more of the application services are distributed among one or more application service nodes. In exemplary rule '3', associating the value 'ASN1.ServerProcess>95%' for the criteria (312) with the value 'ASN1.Add_Node' for the action (413) specifies allocating an additional application service node that provides the same application services as the application service node 'ASN1' when the process of the service server on the application service node 'ASN1' consumes on average more than ninety-five percent of the processor utilization of the application service node 'ASN1's processors. In exemplary rule '4', associating the value 'ASN1.ServerProcess<40%' for the criteria (312) with the value 'ASN1.Recong_Node' for the action (413) specifies reconfiguring the application service node 'ASN1' to provide a different set of application services when the process of the service server on the application service node 'ASN1' consumes on average less than forty percent of the processor utilization of the application service node 'ASN1's processors. Readers will note that exemplary performance ruleset of Table 2 above is for explanation and not for limitation. Other performance rulesets as will occur to those of skill in the art may also be useful in providing policy-based application services to an application running on a computing system according to embodiments of the present invention.

Establishing (306) a performance ruleset (131) according to the method of FIG. 3 may be carried out by receiving, in an administration module from a system administrator, a set of actions and corresponding criteria that specify when the actions are to be performed based on the performance of the computing system, and creating the performance ruleset (131) according to the received actions and corresponding criteria. The administration module is a software component that the system administration may use to configure the computing system that includes the compute node. The particular compute node on which the administration module creates the performance ruleset (131) is typically specified by the system administrator through a user interface provided by the administration module. The administration module may be installed directly on the compute node or any other computer network connected to the compute node. The administration module may create the performance ruleset (131) on the compute node through a data communication connection implemented using shared memory space, a CORBA framework, a JTAG network, web services, a MPI library, or any other data communication implementation as will occur to those of skill in the art.

The method of FIG. 3 includes measuring (316) performance (318) of the computing system. The measured performance (318) of FIG. 3 represents the performance of the nodes and the software running on the nodes of the computing system. Examples of measured performance (318) may include the percentage of processor utilization used by each process being executed by the processors in the computing system, the percentage of idle time for each processor in the computing system, the number of page faults that occur on each processor in the computing system, the amount of available memory accessible by each processor in the computing system, the amount of memory occupied by the software components executing on each processor, and so on. The performance of the computing system may be measured by a performance measurement module that runs as a process on each node of the computing system. The performance measurement module may measure (316) the performance of the computing system by measuring the performance of the compute node or by measuring performance of one or more application service nodes. The performance measurement module may measure (316) the performance of the computing system according to the method of FIG. 3 by taking a plurality of measurements for a predetermined performance metric for a node of the computing system over a period of time and averaging the measured values.

The method of FIG. 3 also includes adjusting (320) the service policy (122) in dependence upon the performance ruleset (131) and the measured performance (318). Adjusting (320) the service policy (122) in dependence upon the performance ruleset (131) and the measured performance (318) according to the method of FIG. 3 may be carried out by the administration module mentioned above. The administration module may adjust (320) the service policy (122) according to the method of FIG. 3 by comparing the measured performance (318) with the criteria (312) for each record in the performance ruleset (131). If the measured performance (318) satisfies the criteria (312) of one of the records, then the administration module may execute the action (314) associated with the criteria (312) satisfied by the measured performance (318). The action (314) associated with the criteria (312) satisfied by the measured performance (318) may identify computer program instructions for carrying out adjustments to the service policy (122). Such adjustments advantageously operate to reconfigure the application services used by the application an effort to optimize the performance of the computing system or adapt the computing system to a changing environment.

The method of FIG. 3 also includes specifying (301), by the application, a service type (305) for use. The application may specify (301) a service type (305) for use according to the method of FIG. 3 by including an instruction that contains the service type (305) in the computer program instructions implementing the application at a particular point along the flow of execution. For example, at a particular point along the flow of execution for the application, the computer program instructions implementing the application may contain machine code representing the following instruction:

Execute_Service('Single_Prec_Matrix_Mult');

In the exemplary instruction above, the function 'Execute_Service' is a function that instructs the application to execute the application service specified in the service policy (122) for the service type (305) having a value of 'Single_Prec_Matrix_Mult.' Including such an exemplary instruction in the computer program instructions implementing the application specifies that the application use a single precision matrix multiplication type of service. Readers will note that the exemplary instruction above is for explanation and not for limitation. Other instructions as will occur to those of skill in the art may also be useful in providing policy-based application services to an application running on a computing system according to embodiments of the present invention.

The method of FIG. 3 includes retrieving (303), by the application, the specified application service (307) from the service policy (122) in dependence upon the specified service type (305). Retrieving (303), by the application, the specified application service (307) from the service policy (122) in dependence upon the specified service type (305) according to the method of FIG. 3 may be carried out by looking up in the service policy (122) the application service identifier (302) associated with the service type (304) having the same value as the specified service type (305).

The method of Figure also includes accessing (322), by the application, the specified application service (307). Accessing (322), by the application, the specified application service (307) according to the method of FIG. 3 may be carried out by calling a function of the API for the specified application service (307). Calling a function of the API for the specified application service (307), however, is for explanation only. In another embodiment, an administration module may modify, according to the service policy (122), entry and exit hooks in the application's code so that processor control is transferred from the application to the application services at the proper points in the application's code during the flow of execution. In such an example, accessing (322) the specified application service for a service type may be carried out simply by executing the computer program instructions implementing the application.

As mentioned above, application services may be distributed among one or more application service nodes in a distributed computing system. When the application services are distributed among one or more application service nodes, accessing (322), by the application, the specified application service may be carried out by retrieving, from the application service node, computer program instructions implementing the specified application service, and executing, by the compute node, the computer program instructions implementing the specified application service. Accessing (322), by the application, the specified application service may also be carried out by requesting, by the application, that the application service node perform the specified application service, and executing, by the application service node, computer program instructions implementing the specified application service.

Figure 4:
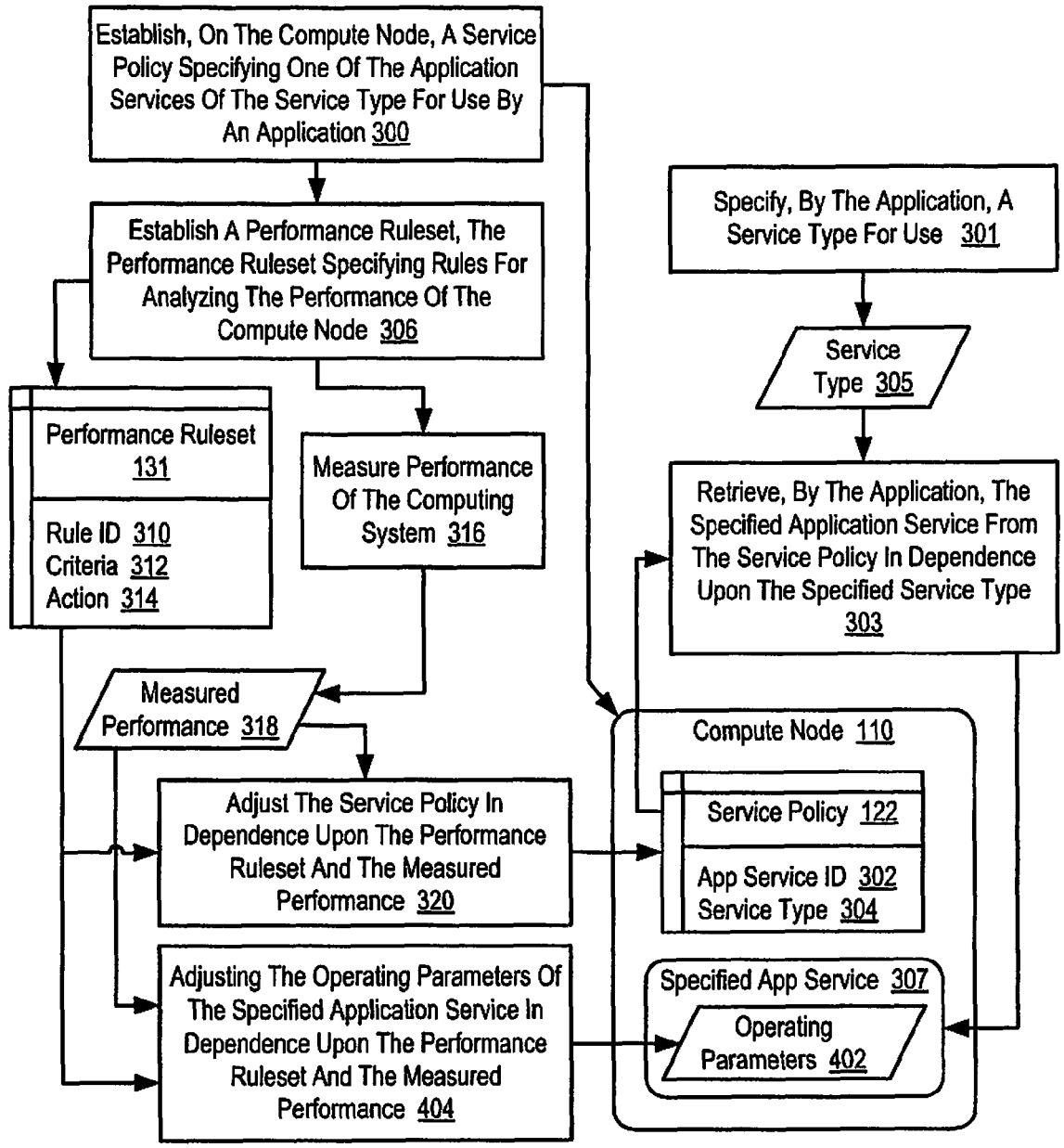
FIG. 4 sets forth a flow chart illustrating a further exemplary method for providing policy-based application services to an application running on a computing system according to embodiments of the present invention.

In addition to adjusting the service policy in dependence upon the performance ruleset and the measured performance, the operating parameters of an application service specified in a service policy for use by an application may also be adjusted in dependence upon the performance ruleset and the measured performance. Adjusting the operating parameters of an application service specified in a service policy may be advantageous when the performance of the current application service can be adjusted more efficiently than switching to a different application service of the same type. For further explanation, therefore, FIG. 4 sets forth a flow chart illustrating a further exemplary method for providing policy-based application services to an application running on a computing system according to embodiments of the present invention that includes adjusting (404) the operating parameters (402) of the specified application service (307) in dependence upon the performance ruleset (131) and the measured performance (318). In the example of FIG. 4, the computing system includes at least one compute node (110). The compute node (110) includes an application and a plurality of application services of a service type.

The method of FIG. 4 is similar to the method of FIG. 3 in that the method of FIG. 4 includes establishing (300), on the compute node, a service policy (122) specifying one of the application services of the service type for use by the application, establishing (306) a performance ruleset (131), the performance ruleset (131) specifying rules for analyzing the performance of the computing system, measuring (316) performance (318) of the computing system, adjusting (320) the service policy in dependence upon the performance ruleset (131) and the measured performance (318), specifying (301), by the application, a service type (305) for use, and retrieving (303), by the application, the specified application service (307) from the service policy (122) in dependence upon the specified service type (305). The example of FIG. 4 is also similar to the example of FIG. 3 in that the service policy (122) of FIG. 4 includes an application service identifier (302) and a service type (304). The example of FIG. 4 is also similar to the example of FIG. 3 in that the performance ruleset (131) includes rule identifier (310), criteria (312), and an action (314).

The method of FIG. 4 includes adjusting (404) the operating parameters (402) of the specified application service (307) in dependence upon the performance ruleset (131) and the measured performance (318). The operating parameters (402) of FIG. 4 represent values used by the computer program instructions implementing the specified application service (307) to perform the specified application service (307). For example, in a double precision matrix multiplication service, the operating parameters may include a value that indicates the amount of cache memory available to the process implementing the service. Adjusting (404) the operating parameters (402) of the specified application service (307) according to the method of FIG. 4 may be carried out by the application or the administration module mentioned above. The administration module may adjust (404) the operating parameters (402) of the specified application service (307) according to the method of FIG. 4 by comparing the measured performance (318) with the criteria (312) for each record in the performance ruleset (131). If the measured performance (318) satisfies the criteria (312) of one of the records, then the administration module may execute the action (314) associated with the criteria (312) satisfied by the measured performance (318). The action (314) associated with the criteria (312) satisfied by the measured performance (318) may identify computer program instructions for carrying out adjustments to the operating parameters (402). Such adjustments advantageously operate to reconfigure the application services used by the application in an effort to optimize the performance of the computing system or adapt the computing system to a changing environment.

In addition to adjusting the service policy or the operating parameters of an application service specified in a service policy in dependence upon a performance ruleset and measured performance of the computing system, the application service nodes of a computing system may administered in dependence upon the performance ruleset and the measured performance. For further explanation, therefore, FIG. 5 sets forth a flow chart illustrating a further exemplary method for providing policy-based application services to an application running on a computing system according to embodiments of the present invention that includes administering (506) the application service nodes in dependence upon the performance ruleset (131) and the measured performance (318). The computing system is implemented as a distributed computing system that includes at least one compute node and one or more application service nodes. The compute node includes an application and a plurality of application services of a service type. One or more of the application services are distributed among the application service nodes.

Figure 5:
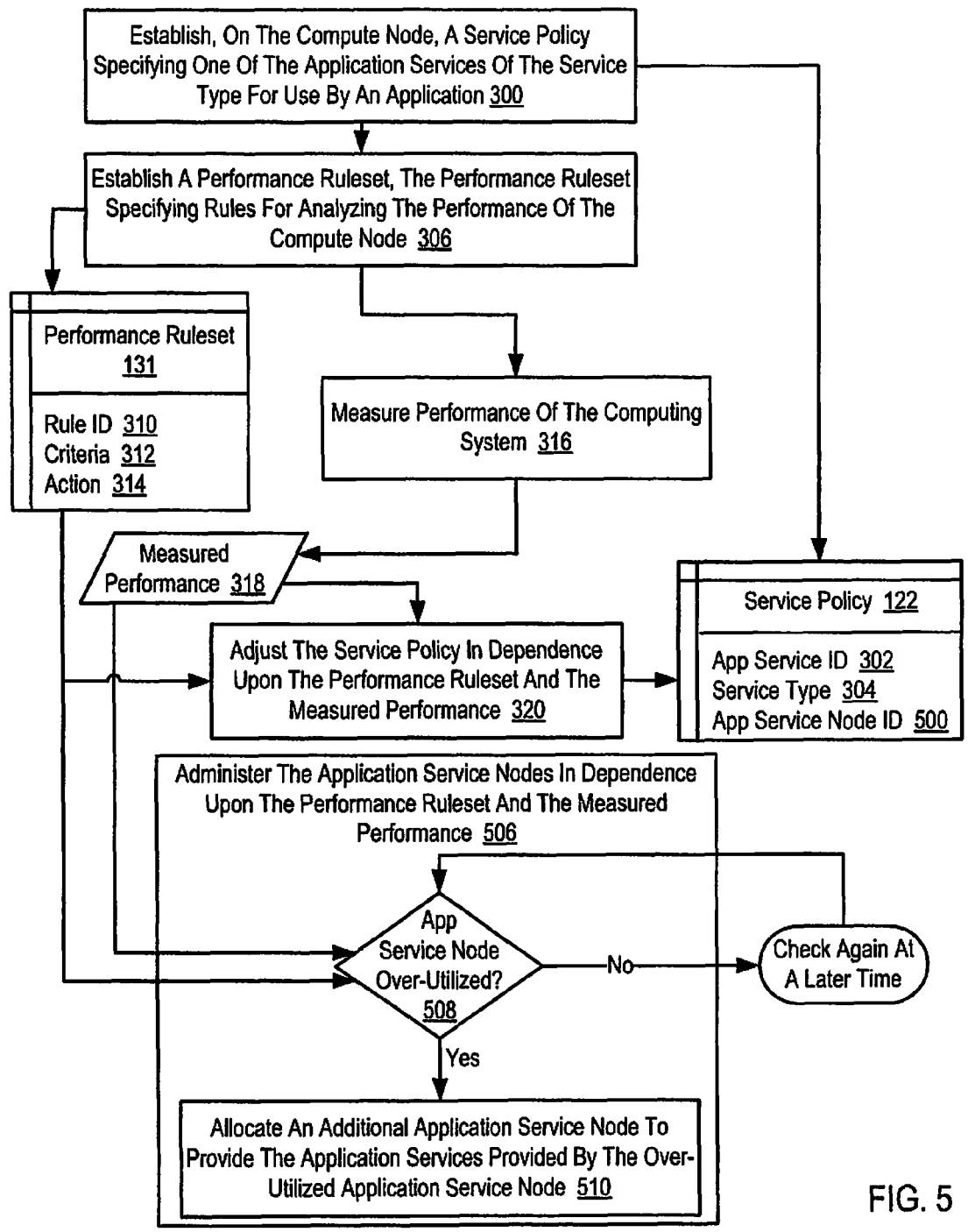
FIG. 5 sets forth a flow chart illustrating a further exemplary method for providing policy-based application services to an application running on a computing system according to embodiments of the present invention.

The method of FIG. 5 is similar to the method of FIG. 3 in that the method of FIG. 5 includes establishing (300), on the compute node, a service policy (122) specifying one of the application services of the service type for use by the application, establishing (306) a performance ruleset (131), the performance ruleset (131) specifying rules for analyzing the performance of the computing system, measuring (316) performance (318) of the computing system, and adjusting (320) the service policy in dependence upon the performance ruleset (131) and the measured performance (318). The example of FIG. 5 is also similar to the example of FIG. 3 in that the service policy (122) includes an application service identifier (302) and a service type (304). In the example of FIG. 5, however, the service policy (122) also specifies an application service node that is to provide each specified application service by including an application service node identifier (500) in each record. The example of FIG. 5 is also similar to the example of FIG. 3 in that the performance ruleset (131) includes rule identifier (310), criteria (312), and an action (314).

The method of FIG. 5 also includes administering (506) the application service nodes in dependence upon the performance ruleset (131) and the measured performance (318). Administering (506) the application service nodes in dependence upon the performance ruleset (131) and the measured performance (318) according to the method of FIG. 5 includes determining (508) whether one of the application service nodes is over-utilized in dependence upon the performance ruleset (131) and the measured performance (318). An over-utilized application service node is a node whose available processor utilization for providing application services is less than a predetermined portion of the total processor utilization of the node's processors. The predetermined portion of the total processor utilization of the node's processors used to identify an over-utilized application service node may be specified in the criteria (312) of the performance ruleset. Determining (508) whether one of the application service nodes is over-utilized according to the method of FIG. 5, therefore, may be carried out by retrieving the measured performance (318) from one of the application service nodes and comparing the measured performance (318) of the node with the criteria (312) for each record in the performance ruleset (131) specifying an over-utilized node condition. If the measured performance (318) of a node satisfies the criteria (312) of one of the records, then the administration module determines that the node whose measured performance (318) satisfies the criteria (312) is an over-utilized application service node. If the measured performance (318) of a node does not satisfy the criteria (312) of one of the records, then the administration module retrieves the measured performance from the node at a later time and again determines at the later time whether the node is over-utilized.

Administering (506) the application service nodes in dependence upon the performance ruleset (131) and the measured performance (318) according to the method of FIG. 5 also includes allocating (510) an additional application service node to provide the application services provided by the over-utilized application service node. Allocating (510) an additional application service node to provide the application services provided by the over-utilized application service node according to the method of FIG. 5 may be carried out by executing, by the administration module, the action (314) associated with the criteria (312) used to determine that the node was over-utilized. The action (314) associated with the criteria (312) used to determine that the node was over-utilized may identify computer program instructions for carrying out the allocation of an additional application service node. Such an allocation may include configuring an available node with application services and a service server that enable the node to provide application services to a compute node. Such an allocation may also include updating the service policy (122) established on one or more compute nodes to enable the applications of these compute nodes to utilize the application services provided by the newly allocated application service node.

Instead of allocating an additional application service node to provide the application services provided by the over-utilized application service node, administering the application service nodes in dependence upon a performance ruleset and measured performance may also include reconfiguring an under-utilized application service node. For further explanation, therefore, FIG. 6 sets forth a flow chart illustrating a further exemplary method for providing policy-based application services to an application running on a computing system according to embodiments of the present invention that includes reconfiguring (604) an under-utilized application service node. The computing system is implemented as a distributed computing system that includes at least one compute node and one or more application service nodes. The compute node includes an application and a plurality of application services of a service type. One or more of the application services are distributed among the application service nodes.

Figure 6:
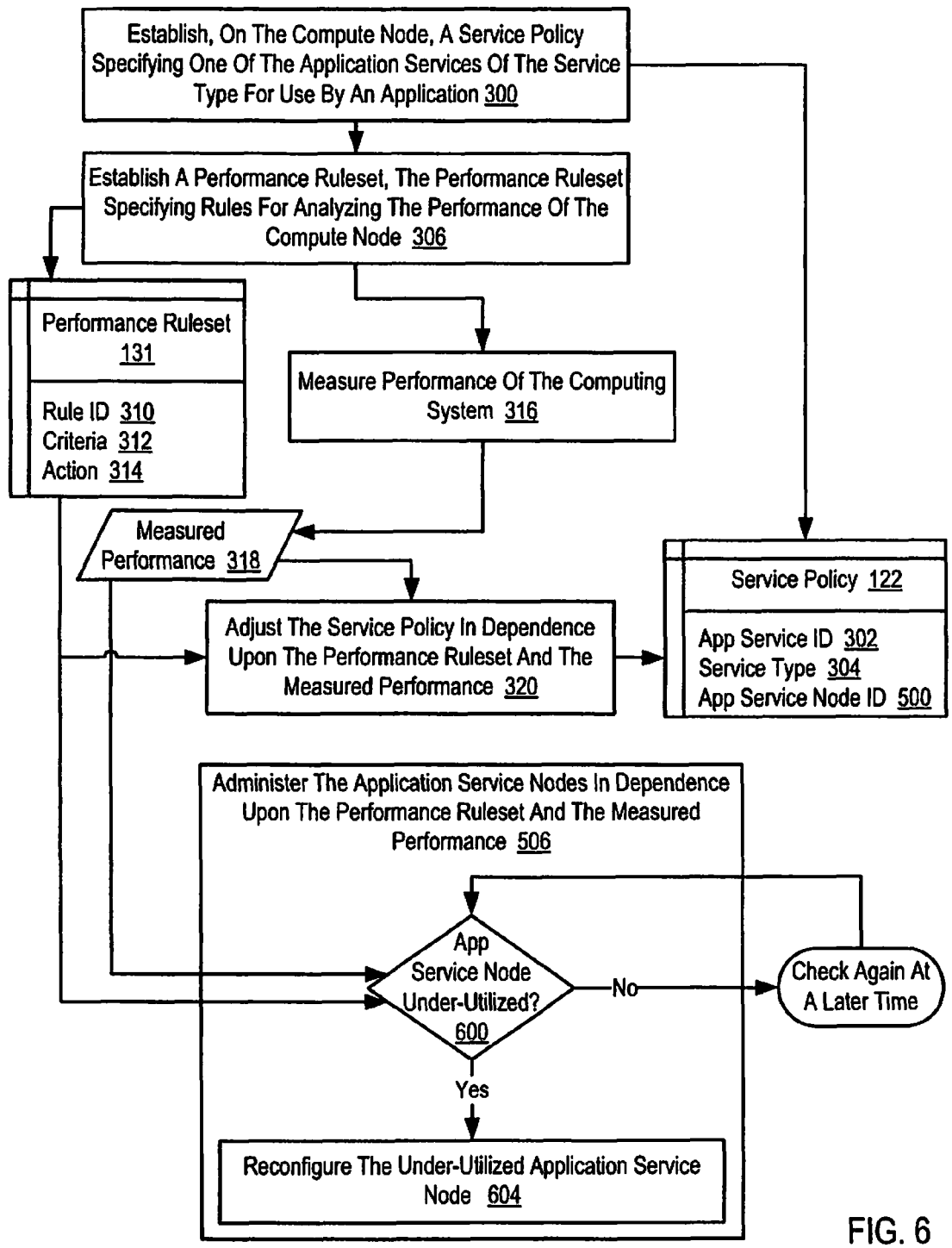
FIG. 6 sets forth a flow chart illustrating a further exemplary method for providing policy-based application services to an application running on a computing system according to embodiments of the present invention.

The method of FIG. 6 is similar to the method of FIG. 3 in that the method of FIG. 6 includes establishing (300), on the compute node, a service policy (122) specifying one of the application services of the service type for use by the application, establishing (306) a performance ruleset (131), the performance ruleset (131) specifying rules for analyzing the performance of the computing system, measuring (316) performance (318) of the computing system, and adjusting (320) the service policy in dependence upon the performance ruleset (131) and the measured performance (318). The example of FIG. 6 is also similar to the example of FIG. 3 in that the service policy (122) includes an application service identifier (302) and a service type (304). In the example of FIG. 6, however, the service policy (122) also specifies an application service node that is to provide each specified application service by including an application service node identifier (500) in each record. The example of FIG. 6 is also similar to the example of FIG. 3 in that the performance ruleset (131) includes rule identifier (310), criteria (312), and an action (314).

The method of FIG. 6 also includes administering (506) the application service nodes in dependence upon the performance ruleset (131) and the measured performance (318). Administering (506) the application service nodes in dependence upon the performance ruleset (131) and the measured performance (318) according to the method of FIG. 6 includes determining (600) whether one of the application service nodes is under-utilized in dependence upon the performance ruleset and the measured performance. An under-utilized application service node is a node whose available processor utilization for providing application services is more than a predetermined portion of the total processor utilization of the node's processors. The predetermined portion of the total processor utilization of the node's processors used to identify an under-utilized application service node may be specified in the criteria (312) of the performance ruleset. Determining (600) whether one of the application service nodes is under-utilized according to the method of FIG. 6, therefore, may be carried out by retrieving the measured performance (318) from one of the application service nodes and comparing the measured performance (318) of the node with the criteria (312) for each record in the performance ruleset (131) specifying an under-utilized node condition. If the measured performance (318) of a node satisfies the criteria (312) of one of the records, then the administration module determines that the node whose measured performance (318) satisfies the criteria (312) is an under-utilized application service node. If the measured performance (318) of a node does not satisfy the criteria (312) of one of the records, then the administration module retrieves the measured performance from the node at a later time and again determines at the later time whether the node is under-utilized.

Administering (506) the application service nodes in dependence upon the performance ruleset (131) and the measured performance (318) according to the method of FIG. 6 also includes reconfiguring (604) the under-utilized application service node. In the method of FIG. 6, reconfiguring (604) the under-utilized application service node may be carried out by executing, by the administration module, the action (314) associated with the criteria (312) used to determine that the node was under-utilized. The action (314) associated with the criteria (312) used to determine that the node was under-utilized may identify computer program instructions for carrying out the reconfiguration of the under-utilized application service node. Such a reconfiguration may include reconfiguring the under-utilized node to provide additional application services to utilize the currently available processing bandwidth. Such a reconfiguration may also include reconfiguring the under-utilized node to provide the same application services to a larger number of compute nodes to utilize the currently available processing bandwidth. Such a reconfiguration may also include de-allocating the under-utilized application service node if more than one application service node provides the same application services as the under-utilized application service node. Such a reconfiguration may further include updating the service policy (122) established on one or more compute nodes to enable the applications of these compute nodes to utilize the application services in a manner that reflects the reconfiguration of the under-utilized application service node.

In view of the explanations set forth above, readers will recognize that the benefits of providing policy-based application services to an application running on a computing system according to embodiments of the present invention include:

the ability to configure application services used by an application based upon the hardware and software environment in which the application runs,
the ability to adapt an application to a new environment or to meet new requirements by providing a variety of application services for use by the application, and
the ability to dynamically adjust an application to changing conditions in a computing environment by reassigning application services used by the application according to the changed conditions.

Exemplary embodiments of the present invention are described largely in the context of a fully functional computing system for providing policy-based application services to an application running on a computing system. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of providing policy-based application services to an application running on a computing system,
the computing system comprising at least one compute node, the at least one compute node comprising an application and a plurality of application services of a service type, the method comprising:
establishing, on the at least one compute node, a service policy specifying one of the application services of the service type for use by the application;
establishing a performance ruleset, the performance ruleset specifying rules for analyzing the performance of the computing system;
measuring performance of the computing system; and
adjusting the service policy in dependence upon the performance ruleset and the measured performance.

2. The method of claim 1 further comprising accessing, by the application, the specified application service.

3. The method of claim 1 wherein each application service is characterized by operating parameters, the method further comprising:
adjusting the operating parameters of the specified application service in dependence upon the performance ruleset and the measured performance.

4. The method of claim 1 wherein:
the computing system is a distributed computing system further comprising one or more application service nodes;
one or more of the application services are distributed among the application service nodes; and the service policy also specifies an application service node that is to provide the specified application service.

5. The method of claim 4 wherein measuring performance of the computing system further comprises measuring performance of the at least one compute node.

6. The method of claim 4 wherein measuring performance of the computing system further comprises measuring performance of the application service nodes.

7. The method of claim 4 further comprising:
administering the application service nodes in dependence upon the performance ruleset and the measured performance.

8. The method of claim 7 wherein administering the application service nodes in dependence upon the performance ruleset and the measured performance further comprises:
determining whether one of the application service nodes is over-utilized in dependence upon the performance ruleset and the measured performance; and
allocating an additional application service node to provide the application services provided by the over-utilized application service node.

9. The method of claim 7 wherein administering the application service nodes in dependence upon the performance ruleset and the measured performance further comprises:
determining whether one of the application service nodes is under-utilized in dependence upon the performance ruleset and the measured performance; and
reconfiguring the under-utilized application service node.

10. The method of claim 4 wherein the distributed computing system is a parallel computer.

11. A computing system for providing policy-based application services to an application, the computing system comprising at least one compute node, the at least one compute node comprising an application and a plurality of application services of a service type, the computing system further comprising computer processors and computer memory operatively coupled to the computer processors, the computer memory comprising computer program instructions for:
establishing, on the at least one compute node, a service policy specifying one of the application services of the service type for use by the application;
establishing a performance ruleset, the performance ruleset specifying rules for analyzing the performance of the computing system;
measuring performance of the computing system; and
adjusting the service policy in dependence upon the performance ruleset and the measured performance.

12. The computing system of claim 11 further comprising computer program instructions for accessing, by the application, the specified application service.

13. The computing system of claim 11 wherein the computing system is a distributed computing system further comprising one or more application service nodes, one or more of the application services are distributed among the application service nodes, and the service policy also specifies an application service node that is to provide the specified application service, the computing system further comprising computer program instructions for:
administering the application service nodes in dependence upon the performance ruleset and the measured performance.

14. A computer program product for providing policy-based application services to an application running on a computing system, the computing system comprising at least one compute node, the at least one compute node comprising an application and a plurality of application services of a service type, the computer program product comprising a non-signal computer readable recordable medium, the computer program product comprising computer program instructions for:
establishing, on the at least one compute node, a service policy specifying one of the application services of the service type for use by the application;
establishing a performance ruleset, the performance ruleset specifying roles for analyzing the performance of the computing system;
measuring performance of the computing system; and
adjusting the service policy in dependence upon the performance ruleset and the measured performance.

15. The computer program product of claim 14 further comprising computer program instructions for accessing, by the application, the specified application service.

16. The computer program product of claim 14 wherein:
the computing system is a distributed computing system further comprising one or more application service nodes;
one or more of the application services are distributed among the application service nodes; and
the service policy also specifies an application service node that is to provide the specified application service.

17. The computer program product of claim 16 further comprising computer program instructions for:
determining whether one of the application service nodes is over-utilized in dependence upon the performance ruleset and the measured performance; and
allocating an additional application service node to provide the application services provided by the over-utilized application service node.

18. The computer program product of claim 16 further comprising computer program instructions for:
determining whether one of the application service nodes is under-utilized in dependence upon the performance ruleset and the measured performance; and
reconfiguring the under-utilized application service node.

* * * * *